(12) United States Patent
Zhang

(10) Patent No.: US 11,287,959 B2
(45) Date of Patent: Mar. 29, 2022

(54) METHOD FOR IMPLEMENTING THEME

(71) Applicant: SHENZHEN TRANSSION HOLDINGS CO., LTD., Shenzhen (CN)

(72) Inventor: Junfeng Zhang, Shenzhen (CN)

(73) Assignee: SHENZHEN TRANSSION HOLDINGS CO., LTD., Shenzhen (CN)

(*) Notice: Subject to any disclaimer, the term of this patent is extended or adjusted under 35 U.S.C. 154(b) by 0 days.

(21) Appl. No.: 16/686,620

(22) Filed: Nov. 18, 2019

(65) Prior Publication Data

US 2020/0371674 A1    Nov. 26, 2020

(30) Foreign Application Priority Data

May 24, 2019 (CN) .......................... 201910441317.1

(51) Int. Cl.
| | | |
|---|---|---|
| H04M 3/42 | (2006.01) | |
| G06F 3/04845 | (2022.01) | |
| G06F 9/54 | (2006.01) | |
| H04L 67/75 | (2022.01) | |

(52) U.S. Cl.
CPC .......... *G06F 3/04845* (2013.01); *G06F 9/542* (2013.01); *H04L 67/36* (2013.01)

(58) Field of Classification Search
CPC ...... G06F 3/04845; G06F 9/542; G06F 9/451; G06F 1/1626; G06F 3/0481; H04L 67/36; H04L 67/26; H04M 1/72563; H04M 1/72566
USPC ....................................................... 715/764
See application file for complete search history.

(56) References Cited

U.S. PATENT DOCUMENTS

| | | | | |
|---|---|---|---|---|
| 6,061,695 A | * | 5/2000 | Slivka | G06F 40/137 |
| | | | | 715/203 |
| 8,612,967 B1 | * | 12/2013 | Delker | G06F 8/61 |
| | | | | 717/175 |
| 9,515,833 B2 | * | 12/2016 | Bartkiewicz | G09C 5/00 |
| 9,565,638 B2 | * | 2/2017 | Hirako | H04W 52/0264 |
| 10,338,736 B1 | * | 7/2019 | Smith | G06F 3/016 |
| 10,601,759 B2 | * | 3/2020 | Peterson | H04L 65/4007 |

(Continued)

FOREIGN PATENT DOCUMENTS

| | | |
|---|---|---|
| CN | 102196086 A | 9/2011 |
| CN | 102821205 A | 12/2012 |

(Continued)

OTHER PUBLICATIONS

Extended European Search Report in counterpart European Patent Application No. 19201357.1, dated Apr. 2, 2020.

(Continued)

*Primary Examiner* — Hassan Mrabi
(74) *Attorney, Agent, or Firm* — Westbridge IP LLC

(57) ABSTRACT

Provided is a method for implementing a theme, which includes: comprising, by the terminal, at least one theme, and at least one application related to the at least one theme; and displaying the at least one application related to the theme on the terminal, when the theme is switched to. The present disclosure further provides a method for implementing a theme applied to a mobile terminal. The present disclosure may provide themes corresponding theme according to the requirements of special groups, greatly enhancing the user experience.

8 Claims, 3 Drawing Sheets

(56) References Cited

U.S. PATENT DOCUMENTS

| | | | |
|---|---|---|---|
| 10,635,713 B2* | 4/2020 | Feng | G06F 3/04842 |
| 2002/0062361 A1* | 5/2002 | Kivipuro | H04L 67/2804 |
| | | | 709/219 |
| 2005/0050474 A1* | 3/2005 | Bells | H04M 1/72544 |
| | | | 715/747 |
| 2006/0206590 A1* | 9/2006 | Wakasa | H04L 67/04 |
| | | | 709/219 |
| 2007/0038934 A1* | 2/2007 | Fellman | G06F 3/0481 |
| | | | 715/700 |
| 2007/0061748 A1* | 3/2007 | Hirose | H04N 5/44543 |
| | | | 715/764 |
| 2008/0092057 A1* | 4/2008 | Monson | G06F 9/451 |
| | | | 715/744 |
| 2008/0220816 A1* | 9/2008 | Ryu | H04M 1/72519 |
| | | | 455/556.1 |
| 2009/0163182 A1* | 6/2009 | Gatti | H04M 1/72427 |
| | | | 455/414.1 |
| 2009/0187856 A1* | 7/2009 | Rapo | G06F 16/4393 |
| | | | 715/810 |
| 2010/0257469 A1* | 10/2010 | Kim | G06F 9/451 |
| | | | 715/763 |
| 2011/0314390 A1* | 12/2011 | Park | G06F 9/451 |
| | | | 715/752 |
| 2012/0011447 A1* | 1/2012 | Bennett | G06F 16/958 |
| | | | 715/745 |
| 2013/0039632 A1* | 2/2013 | Feinson | H04N 9/8211 |
| | | | 386/223 |
| 2013/0063447 A1* | 3/2013 | Matsui | H04L 67/36 |
| | | | 345/473 |
| 2014/0089826 A1* | 3/2014 | Boyd | G11B 27/031 |
| | | | 715/765 |
| 2014/0092424 A1* | 4/2014 | Grosz | G06F 3/04845 |
| | | | 358/1.15 |
| 2014/0195921 A1* | 7/2014 | Grosz | G06Q 30/0601 |
| | | | 715/738 |
| 2015/0054851 A1* | 2/2015 | Kim | G06F 16/54 |
| | | | 345/634 |
| 2015/0074561 A1* | 3/2015 | Zhou | G06F 9/451 |
| | | | 715/760 |
| 2015/0082208 A1* | 3/2015 | Klinger | G06F 3/04847 |
| | | | 715/762 |
| 2015/0082231 A1* | 3/2015 | Ren | H04M 1/72572 |
| | | | 715/778 |
| 2015/0116348 A1* | 4/2015 | Wang | H04M 1/72544 |
| | | | 345/619 |
| 2015/0143456 A1* | 5/2015 | Raleigh | H04L 63/20 |
| | | | 726/1 |
| 2016/0127529 A1* | 5/2016 | Kim | H04L 67/12 |
| | | | 455/418 |
| 2016/0189667 A1* | 6/2016 | Kim | G06F 3/162 |
| | | | 345/619 |
| 2016/0198052 A1* | 7/2016 | Shogaki | G06F 3/04883 |
| | | | 358/1.15 |
| 2016/0246475 A1* | 8/2016 | Garcia | G09G 5/02 |
| 2017/0031564 A1* | 2/2017 | Peterson | H04L 65/4007 |
| 2017/0090732 A1* | 3/2017 | Dong | G06F 3/04845 |
| 2017/0099602 A1* | 4/2017 | Joo | H04W 12/0804 |
| 2017/0115998 A1* | 4/2017 | Fang | G06F 3/04883 |
| 2017/0169585 A1* | 6/2017 | Chen | G06T 11/001 |
| 2017/0280054 A1* | 9/2017 | Li | H04N 21/23418 |
| 2017/0286913 A1* | 10/2017 | Liu | H04W 4/12 |
| 2018/0146218 A1* | 5/2018 | Shimura | H04N 21/6587 |
| 2018/0164981 A1* | 6/2018 | Park | G06F 3/0482 |
| 2018/0176748 A1* | 6/2018 | Kim | H04L 63/0861 |
| 2018/0241870 A1* | 8/2018 | Mukherjee | G06F 3/0485 |
| 2018/0246622 A1* | 8/2018 | Lee | G06F 3/0443 |
| 2018/0246632 A1* | 8/2018 | Tang | G06F 3/04817 |
| 2018/0288208 A1* | 10/2018 | Lee | H04M 1/72575 |
| 2018/0292963 A1* | 10/2018 | Nanjo | G06T 7/0012 |
| 2018/0332163 A1* | 11/2018 | Park | H04M 1/72544 |
| 2018/0336060 A1* | 11/2018 | Liu | G06F 3/0481 |
| 2018/0373403 A1* | 12/2018 | Uemura | G06F 3/04845 |
| 2019/0043231 A1* | 2/2019 | Uzgin | G06T 11/60 |
| 2019/0155484 A1* | 5/2019 | Chu | G06F 3/04817 |
| 2019/0332398 A1* | 10/2019 | Liu | G06F 8/38 |

FOREIGN PATENT DOCUMENTS

| | | |
|---|---|---|
| CN | 104717361 A | 6/2015 |
| WO | 2016149215 A1 | 9/2016 |

OTHER PUBLICATIONS

First Office Action in counterpart Chinese Patent Application No. 202010242005.0, dated Oct. 16, 2020.

Examination Report issued in counterpart Indian Patent Application No. 201924044913, dated Apr. 16, 2021.

* cited by examiner

METHOD FOR IMPLEMENTING THEME

CROSS-REFERENCE TO RELATED APPLICATIONS

The present disclosure claims the benefits of and priority to Chinese Patent Application with No. 201910441317.1, filed on May 24, 2019, the entire disclosure of which is hereby incorporated by reference, in its entirety, for all that it teaches and for all purpose.

TECHNICAL FIELD

The present disclosure relates to terminal, in particular, to a method for implementing a theme.

BACKGROUND

At present, themes can be switched over at will in most terminals, including standby background, lock screen background, prompt sound, etc. Users may voluntarily switch between themes and their requirement can be catered to merely by downloading a theme package from a theme resource application or website and applying it to the terminal.

However, the contents of standby background, lock screen background, prompt sound and the like in current themes, are fixed and unchangeable with respect to each theme, failing to meet the requirements when a user has special demands at different time periods or of different users. This lowers the user experience. In the meanwhile, the standby background or lock screen background in the current themes involves simple picture switches, rather than switches tailored for special groups, which cannot meet the personalized requirements of users.

SUMMARY

The present disclosure is to provide a method for implementing a theme, in which a corresponding theme can be applied according to the demands of users and thus greatly improve user experience.

In order to solve the above-cited problems, the present disclosure provides a method for implementing a theme for a terminal. The terminal includes at least one theme, and at least one application related to the at least one theme. When the theme is switched to, at least one application related to the theme is displayed on the terminal.

Further, the terminal includes at least a first theme related to at least one application and a second theme related to at least one application. The at least one application related to the first theme or the second theme on the terminal are respectively displayed, when the first theme or the second theme is switched to.

Further, the theme is attribute related and/or content related, or attribute unrelated and/or content unrelated to the at least one application.

Further, the theme is provided by the terminal or obtained from a server or a third-party application.

Further, the theme for the terminal is switched to when a switching condition is met, in which the switching condition is preset or user-defined.

Further, the switching condition is a date condition or a time condition.

Further, the first theme is switched to when a first switching condition is met, and the second theme is switched to when a second switching condition is met, in which an attribute of the first switching condition is same or different from an attribute of the second switching condition.

Further, the attribute of the first switching condition and the attribute of the second switching condition are date attributes or time attributes, in which the first switching condition is a first date period or a first time period, or a first date or a first time point, and the second switching condition is a second date period or a second time period different from the first date period or the first time period, or a second date or a second time point different from the first date or the first time point.

Further, a content related to the theme is displayed by the application, when the theme is switched to, in which the content is one or more of news, video and audio.

Further, the terminal has the attribute carrying a first style in the first theme, and the terminal has the attribute carrying a second style in the second theme, in which the attribute carrying the first style is different or partially different from the attribute carrying the second style; and the attribute is standby background and/or lock screen background.

Further, first information related to or unrelated to the first theme is displayed by the terminal, on the standby background or the lock screen background in the first theme, and second information related to or unrelated to the second theme is displayed by the terminal, on the standby background or the lock screen background in the second theme.

Further, the first information and the second information are one or more of text, audio or video.

The present disclosure further provides a method for implementing a theme applied to a mobile terminal, in which the mobile terminal at least includes a first theme and a second theme, and the first theme is associated with at least one first unit on the mobile terminal; the second theme is associated with at least one second unit on the mobile terminal. When the first triggering condition is met, the mobile terminal applies the first theme and displays at least one first unit on the mobile terminal, and when the second triggering condition is met, the mobile terminal applies the second theme and displays at least one second unit on the mobile terminal.

Further, the first unit and the second unit are respectively terminal applications related to the first theme and the second theme, and a push content of the terminal applications are respectively related to the first theme and the second theme.

Further, the method further includes displaying, by a first unit and a second unit respectively, contents related to the first theme or the second theme.

Further, the first triggering condition being met includes a system time of the mobile terminal is within a first time period or without the first time period.

Further, the second triggering condition being met includes a system time of the mobile terminal is within a second time period or without the second time period.

Further, the method further includes: judging, by the server, specific information of the mobile terminal and pushing the first theme and/or the second theme to the mobile terminal according to the specific information.

Further, the specific information includes religious belief of a user using the mobile terminal.

Superiority of the present disclosure lies in that the corresponding theme can be applied according to the requirements of users, greatly enhance the user experience.

DETAILED DESCRIPTION OF THE EMBODIMENTS

The following is a detailed description of embodiments regarding the method for implementing the theme provided in the present disclosure, with reference to the accompanying drawings.

Figure 1:
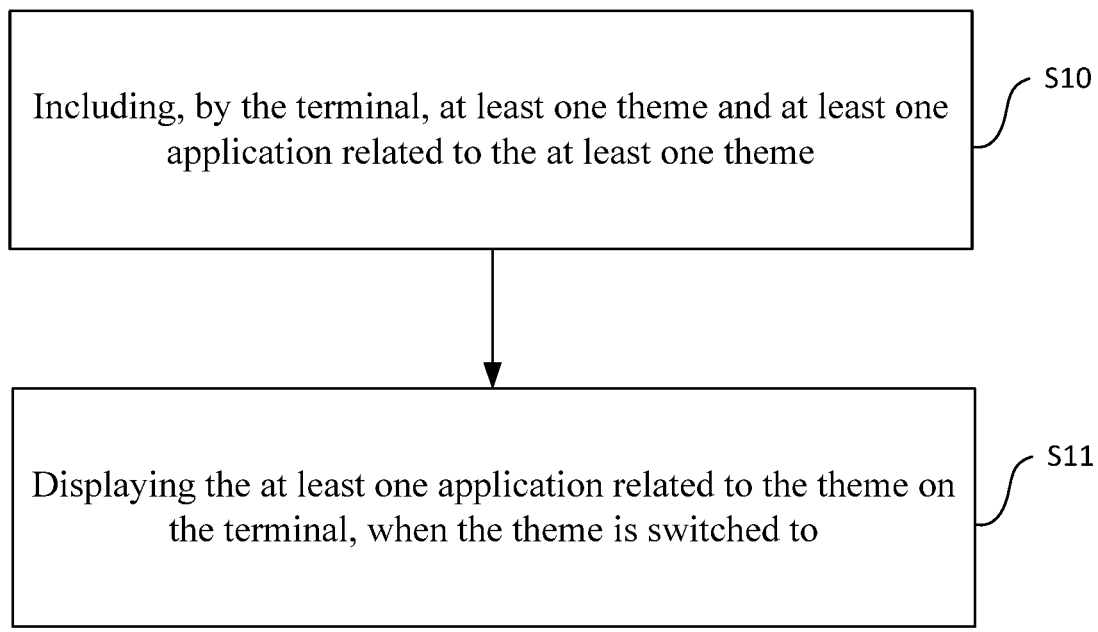
FIG. 1 is a diagram showing the operations in a specific embodiment of a method for implementing a theme for a terminal according to the present disclosure.

The present disclosure provides some embodiments regarding the method for implementing the theme for the terminal. FIG. 1 is a diagram showing the operations in a specific embodiment of a method for implementing a theme for a terminal according to the present disclosure. Referring to FIG. 1, the method for implementing the theme according the present disclosure includes the following operations:

Operation S10, including, by the terminal, at least one theme and at least one application related to the at least one theme. I.e. the theme must correspond to at least one application. The application is an application program (App).

The correlation between the theme and the application may include the following: the attribute and content of the theme are both correlated with the attribute and content of the application, or the attribute and content of the theme are related to one of the attribute and content of the application, or the attribute and content of the theme are related to neither of the attribute and content of the application. The attribute of the theme refers to the usage scenario of the theme; the attribute of the application refers to the type of the application; the content of the theme refers to the interface and icon displayed on the terminal when the theme is applied; and the content of the application refers to the content presented by the application on the terminal.

Further, the theme can be self-provided by the terminal, or be obtained by the terminal user from a server or a terminal user. In the present embodiment, the terminal user obtains the theme from the server. Specifically, the server pushes the theme to the terminal, and the terminal user receives the pushed theme from the server to obtain it.

Further, the terminal includes at least two themes. The attributes or contents between the two different themes may be the same or different, and the attributes or contents of applications related thereto may be the same or different. In the present embodiment, the terminal includes a first theme and a second theme, and the first theme and the second theme have different attributes. The first theme is associated with at least one application and the second theme is associated with at least one application. In which, the applications related to the first theme and the applications related to the second theme can be a same application containing different contents, or different applications with a similar content, or different applications with different attributes, or different applications with the same attributes. In other specific embodiments of the present disclosure, the terminal may include other themes in addition to the first theme and the second theme.

Operation S11, displaying the at least one application related to the theme on the terminal, when the theme is switched to.

In the present embodiment, when the first theme is switched to, at least one application related to the first theme is displayed on the terminal, and when the second theme is switched to, at least one application related to the second theme is displayed on the terminal. For example, the application related to the first theme is a music application, and the application related to the second theme is a game application on the terminal. The terminal displays the music application when the first theme is switched to, and the terminal displays the game application when the second theme is switched to.

Further, when the theme is switched to, content related to the theme is displayed on the application of the terminal. In which, the content is one or more of news, video and audio. Specifically, when the theme is switched to, the terminal user opens an application displayed by the terminal, and the content displayed on the application is content related to the theme. For example, when the theme is for vacation, the content displayed on the application is content related to vacation.

Further, the theme for the terminal is switched to when a switching condition is met. The switching conditions include, but are not limited to, date, date period, time, time period, serving status of the terminal, service time of the terminal or instructions of the terminal user, etc. The switching condition is preset or user-defined. Being preset refers to having set the switching condition for the terminal before obtained by the user. Being self-defined refers to setting the terminal after obtained by the user itself.

Further, in the present embodiment, when the first switching condition is met, the terminal switches to the first theme, and when the second switching condition is met, the terminal switches to the second theme. In which, the attributes between the first switching condition and the second switch condition can be the same or different. The attributes of the first switching condition and the second switching condition are date or time. The first switching condition is a first date period or a first time period, or a first date or a first time point, and the second switching condition is a second date period or a second time period different from the first date period or the first time period, or a second date or a second time point different from the first date or the first time point. For example, if the first switching condition is 6:00 a.m. and the second switching condition is 11:00 a.m., the terminal switches to the first theme when the system time of the terminal reaches 6:00 a.m., and the terminal switches to the second theme when the system time of the terminal reaches 11:00 a.m.

Further, the terminal has the attribute carrying a first style in the first theme, and the terminal has the attribute carrying a second style in the second theme. The attribute may be standby background or lock screen background, or standby background and lock screen background. The attributes of between the first style and the second style are different or partially different. For example, in the present embodiment, the standby background or lock screen background of the first style are different pictures from those on the standby background or lock screen background of the second style, and in other embodiments of the present disclosure, the standby background or lock screen background of the first style contain same pictures as well as different pictures compared to those on the standby background or lock screen background of the second style.

Further, first information related to or unrelated to the first theme is displayed by the terminal, on the standby background or the lock screen background in the first theme, and second information related to or unrelated to the second theme is displayed by the terminal, on the standby background or the lock screen background in the second theme. The first information and the second information include, but are not limited to, one or more of text, audio, or video. For example, if the first theme is for vacation, the terminal displays one or more of text, audio or video related to vacation on standby background or lock screen background.

Figure 2:
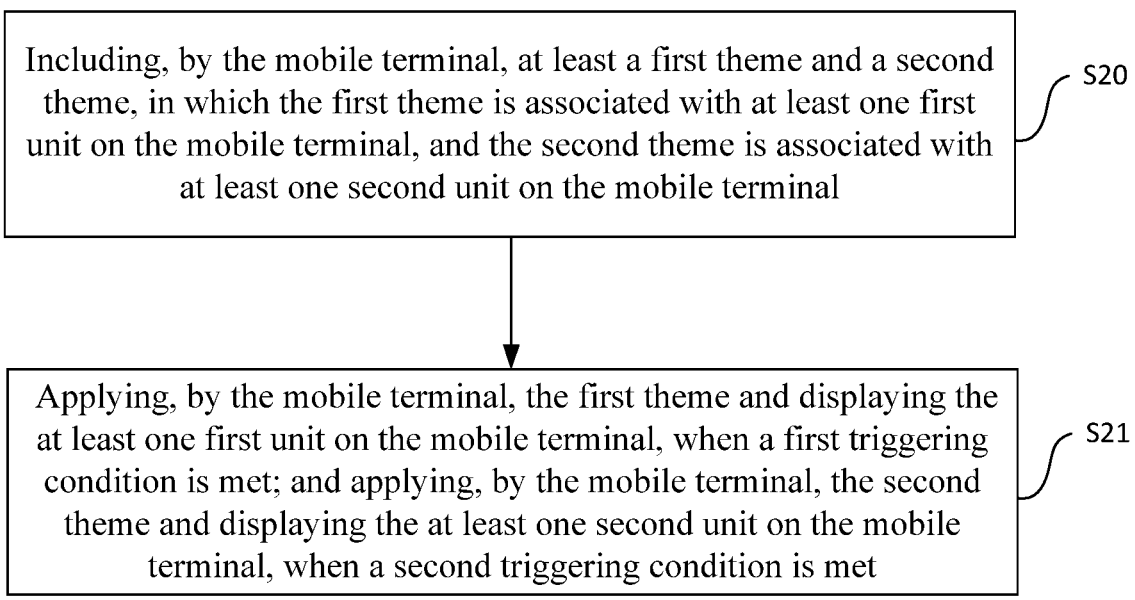
FIG. 2 is a diagram showing the operations in a specific embodiment of a method for implementing a theme applied in a mobile terminal according to the present disclosure.

The present disclosure also provides an embodiment of the method for implementing the theme applied to the mobile terminal. FIG. 2 is a diagram showing the operations in a specific embodiment of a method for implementing a theme applied in a terminal according to the present disclosure. Referring to FIG. 2, the method for implementing the theme applied to the mobile terminal includes the following operations:

Operation S20, including, by the mobile terminal, at least a first theme and a second theme, in which the first theme is associated with at least one first unit on the mobile terminal, and the second theme is associated with at least one second unit on the mobile terminal. That is, the first theme must correspond to at least one first unit, and the second theme must correspond to a second unit.

The first theme and the second theme can be self-provided by a terminal, or obtained by a server or a third-party application. In which, the first theme and/or the second theme can be pushed to the terminal by the server, which is obtained by the mobile terminal. Further, it is judged, by the server, specific information of the mobile terminal and pushing the first theme and/or the second theme to the mobile terminal according to the specific information. The specific information includes, but is not limited to the religious beliefs of mobile terminal users. The server pushes the first theme and/or the second theme in accordance with the specific information to the mobile terminal. Further, the server can obtain feedback information of a mobile terminal user, according to which the specific information of the mobile terminal is judged.

The first unit includes, but is not limited to, a terminal application related to the first theme, and text, audio, video or pictures capable of displaying content related to the first theme. The second unit includes, but is not limited to, terminal applications related to the second theme, and text, audio, video or pictures capable of displaying content related to the second theme.

In the present embodiment, the first unit is a terminal application (App) related to the first theme, and the content pushed by the application is related to the first theme. The second unit is a terminal application (App) related to the second theme, and the content pushed by the application is related to the second theme.

In other embodiments, the first unit can display content related to the first theme; the second unit can display content related to the second theme. The content includes but is not limited to text, audio, video or pictures. Further, the first unit and the second unit are both lock screen backgrounds or standby backgrounds, and the lock screen background or standby background can display contents related to the first theme or the second theme. For example, if the first theme is a vacation theme, the lock-screen background or standby background displays pictures of vacation-related content, and if the second theme is a work theme, the lock-screen background or standby background displays pictures of work-related content.

Operation S21, applying, by the mobile terminal, the first theme and displaying the at least one first unit on the mobile terminal, when a first triggering condition is met; and applying, by the mobile terminal, the second theme and displaying the at least one second unit on the mobile terminal, when a second triggering condition is met.

Further, the first triggering condition being met includes a system time of the mobile terminal is within a first time period or without the first time period. The first time period may refer to a certain time period of the day. In the present embodiment, when the mobile terminal system time is within a first time period, the mobile terminal applies the first theme and displays at least one first unit on the mobile terminal. In another embodiment of the present disclosure, when the mobile terminal system time is without the first time period, the mobile terminal applies the first theme and displays at least one first unit on the mobile terminal.

Further, the second triggering condition being met comprises a system time of the mobile terminal is within a second time period or without the second time period. The second time period may refer to a certain time period of the day. In the present embodiment, when the mobile terminal system time is within a second time period, the mobile terminal applies the second theme and displays at least one first unit on the mobile terminal. In another embodiment of the present disclosure, when the mobile terminal system time is without the second time period, the mobile terminal applies the second theme and displays at least one second unit on the mobile terminal.

In the present embodiment, the first time period is complementary to the second time period. For example, if the first time period is from sunrise to sunset, and the second time period is from sunset to sunrise, the mobile terminal applies the first theme when the system time of the mobile terminal is from sunrise to sunset, and the mobile terminal applies the second theme when the system time of the mobile terminal is from sunset to sunrise.

Below describes some embodiment of the method for implementing the theme.

Figure 3:
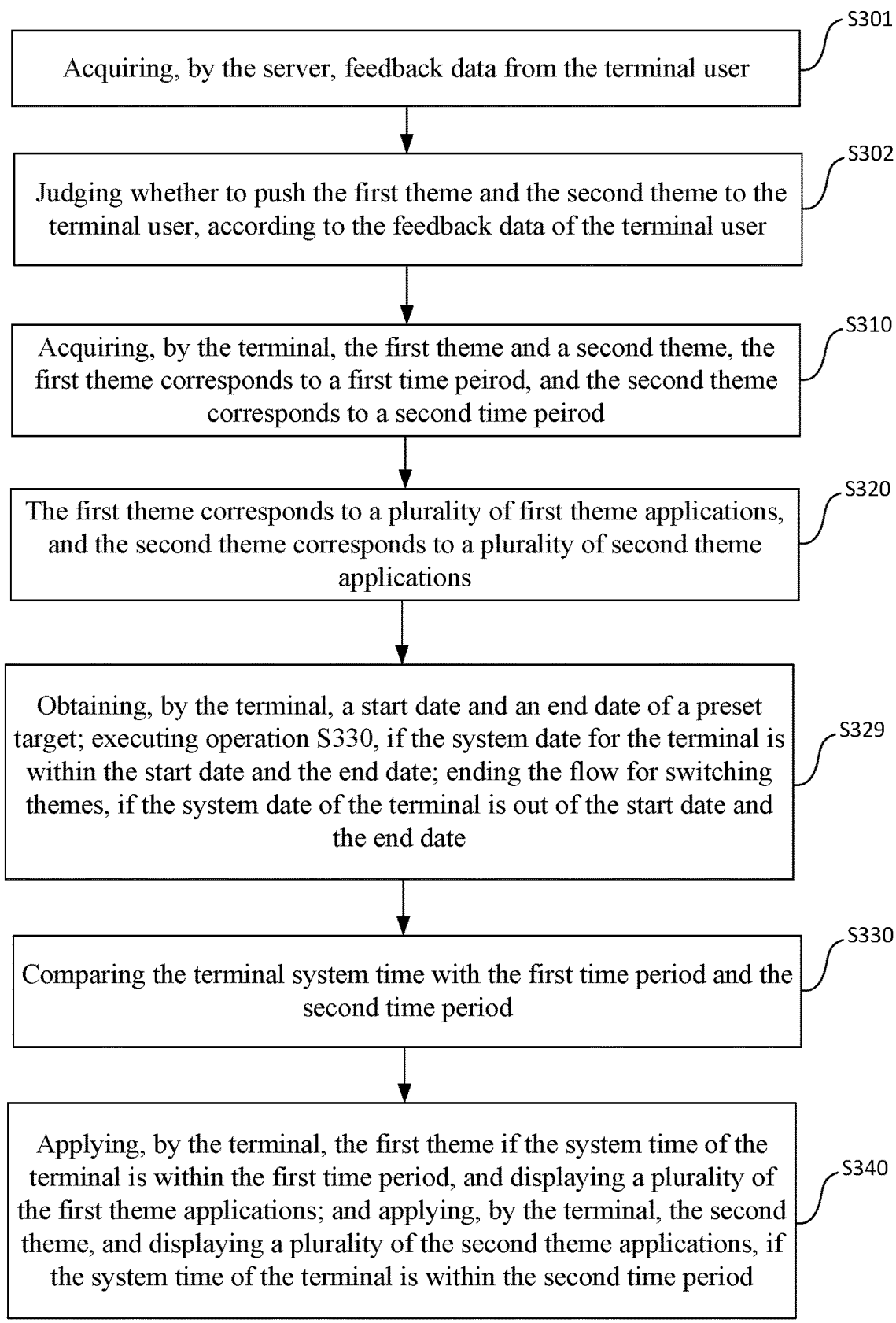
FIG. 3 is a diagram showing the operations in an embodiment of a method for implementing a theme.

FIG. 3 is a diagram showing the operations in an embodiment of a method for implementing a theme. Referring to FIG. 3, the method for implementing the theme includes the following operations:

In operation S310, acquiring, by the terminal, the first theme and a second theme.

The terminal can automatically acquire the first theme and the second theme, which can be alternatively pushed by a server to the terminal. The terminal acquires the first theme and the second theme according to the push of the server.

Further, in the case where the server pushes the first theme and the second theme to the terminal, before operation S310, the method for implementing the theme further includes the following operations:

Operation S301, acquiring, by the server, feedback data from the terminal user. The server may obtain feedback data of the terminal user from application software of the terminal user. The feedback data includes preferences of terminal users, frequency of using the terminal, time zone of the terminal, etc.

Operation S302, judging whether to push the first theme and the second theme to the terminal user, according to the feedback data of the terminal user. If the terminal user is the preset target group, the server pushes the first theme and the second theme to the terminal user, and if the terminal user is not the preset target group, the server may not push the first theme and the second theme to the terminal user. In the present embodiment, the preset target group believes in Islam. If the server judges that the terminal user is a group that believes in Islam according to the feedback data of the terminal user, the server pushes the first theme and the second theme to the terminal user.

The benefit regarding judging whether to push the first theme and the second theme to the terminal user through the feedback data of the terminal user according to the present disclosure, lies in that the group that believes in Islam can be accurately distinguished from the group that does not believe in Islam, and only the group that believes in Islam would be pushed with the first theme and the second theme, rather than the group who does not, thus avoiding unnecessary conflicts.

Further, in the present embodiment, the first theme corresponds to a first time period, and the second theme corresponds to a second time period.

In Ramadan of Islam, Muslim groups fasts from sunrise to sunset. Therefore, in the present embodiment, the first time period corresponds to the time when Muslim group fasts, and the second time period corresponds to the time when Muslim groups do not fast, that is, the first time period starts at sunrise and ends at sunset, and the second time period starts at sunset and ends at sunrise. For example, if the sunrise time of a certain day is 6 a.m., the sunset time is 19 p.m., and the sunrise time for the day after is 6.10 a.m., the first time period is from 6.00 a.m. to 19.00 p.m., and the second time period is from 19.00 p.m. to 6.10 a.m. In other embodiments of the present disclosure, the first time period and the second time period may also be selected according to the specific usage. In the present operation, as the sunrise time and sunset time varies on different days, the terminal can acquire the sunrise time and sunset time on the very day through application. Furthermore, the server can obtain the time zone where the terminal user is located according to the feedback information of the terminal user, so as to more accurately determine the sunrise time and sunset time.

Operation S320, the first theme corresponds to a plurality of first theme applications, and the second theme corresponds to a plurality of second theme applications.

The attribute of the first theme application is related to the first theme, and the attribute of the second theme application is related to the second theme. If the first theme is quiet theme, the attribute applied by the first theme should in accordance with the quiet theme, and if the second theme is a daily life theme, the attribute applied by the second theme should be accordance with the daily life theme.

The attribute of the first theme application may be a content attribute of the first theme application or an application attribute of the first theme application; the attribute of the second theme application may be a content attribute of the second theme application or an application attribute of the second theme application.

The content attribute refers to the subject of the pushed content. For example, for a music application, when the theme of the pushed content matches the first theme, the attribute of the music application is the same as the content of the first theme. And when the theme of the pushed content matches the second theme, the attribute of the music application is the same as the content of the second theme. It can be seen that the first theme application and the second theme application can be a same application carrying different content attributes.

Application attribute refers to the attribute that the application itself has, for example, entertainment type application or practical type application. For example, if the first theme is the fast theme of the Islamic group, the application attribute of the first theme should conform to the fasting theme of Islam, and the application of the first theme includes the practical type application in conformity to the fasting theme that the Islamic group can use during fasting, rather than the entertainment application that the Islamic group cannot use during fasting. If the second theme is a life theme out of the fasting period of the Islamic group, the second theme application may include entertainment type applications that can be used in the daily life of the Islamic group, and of course may also include other practical type applications that conform to the life theme. It can be seen that the first theme application and the second theme application can be different applications.

In the present embodiment, the plurality of first theme applications include: applications having different content attributes from the second theme application, as well as different applications having different application attributes from the second theme application. The plurality of second theme applications include: applications having different content attributes from the first theme application, as well as different applications having different application attributes from the first theme application.

Further, when the terminal applies the first theme, after a plurality of the first theme applications are selected, the content pushed by the first theme application is related to the first theme. When the terminal applies the second theme, after a plurality of the second theme applications are selected, the content pushed by the second theme application is related to the second theme.

Further, in the present embodiment, the first theme further has lock screen background and standby background that carry the first style, and the second theme also has lock screen background and standby background that carry the second style. When the first theme is the fasting theme for Islamic groups, the first style lock screen background and standby background include but are not limited to lock screen background and standby background carrying the fresh and natural style, to conform to the fasting atmosphere. When the second theme is the daily life theme of Islamic groups, the lock screen background and standby background carrying the second style include but are not limited to a lively and warm style, to conform to the atmosphere of daily life.

Furthermore, Koran is recorded on the lock screen background of the first style, convenient for Islamic groups to read during fasting, and Koran can also be recorded on the lock screen background carrying the second style, which is convenient for Islamic groups to read during non-fasting.

The first theme may further have a prompt sound for the first style, and the second theme may further have a prompt sound for the second style. When the first theme is the fasting theme of Islamic groups, the prompt sound for the first style includes, but is not limited to, mute or sounds soft to avoid disturbing the Muslim fasting. When the second theme is the daily life theme of the Islamic faith group, the prompt sound for the second style includes but is not limited to the voice of passionate sound, so as to ensure that the volume of the sound is loud enough for the Islamic faith group to receive the external contact request.

In operation S330, comparing the terminal system time with the first time period and the second time period. In the present operation, the system time of the terminal is the time of the built-in system of the terminal itself, which can be synchronized with the network time.

Optionally, before operation S330, the method further includes the following operations: operation S329, obtaining, by the terminal, a start date and an end date of a preset target; executing operation S330, if the system date for the terminal is within the start date and the end date; ending the flow for switching themes, and maintaining the original theme for the terminal, if the system date of the terminal is out of the start date and the end date. In the present embodiment, the preset target refers to Ramadan of Islam, and the terminal can obtain the start date and end date of Ramadan through application software. In the present operation, the server can obtain the time zone where the terminal user is located according to the feedback information of the terminal user, so as to more accurately determine the start date and end date of the preset target. Between operations S330 and S329, the system time of the terminal is specifically the hour, minute and second displayed on the terminal, and the system date of the terminal is specifically the month and day displayed on the terminal.

Step S340, if the system time of the terminal is within the first time period, the terminal will apply the first theme, and the terminal will display a plurality of the first theme applications; if the system time of the terminal is within the second time period, the terminal will apply the second theme, and the terminal will display a plurality of the second theme applications.

If the system time of the terminal is within the first time period, the terminal will apply the first theme, and if the system time of the terminal is within the second time period, the terminal will apply the second theme. For example, if the sunrise time of a certain day is 6 a.m., the sunset time is 19 p.m., and the sunrise time for the day after is 6.10 a.m., the first time period is from 6.00 a.m. to 19.00 p.m., and the second time period is from 19.00 p.m. to 6.10 a.m. If the system time of the terminal is 6:01 a.m., which is between 6:00 a.m. and 19.00p.m., the terminal will apply the first theme; if the system time of the terminal is 20.00 p.m., which is between 19.00 p.m. and 6.10a.m, the terminal will apply the second theme.

Further, if the system date of the terminal is between the start date and the end date, and the terminal is a preset target group, the terminal can receive the push containing the Koran sound information regardless of which theme is applied in the terminal. The push content is pushed by the server through an application software. For example, the server pushes the voice containing Koran to the terminal user through a music application for the user to listen to.

Furthermore, if the system date of the terminal is between the start date and the end date, and the terminal user is a preset target group, the terminal user can receive the push of relevant news content customized for the preset target regardless of which theme is applied in the terminal. The push content is pushed by the server through an application software. For example, the server pushes the news content related to Ramadan to the terminal user through a news application for the user to read.

Further, if the system date of the terminal is between the start date and the end date, and the terminal user is a preset target group, an icon pointing to a preset direction will be displayed on the standby screen of the terminal, and the terminal user can turn the terminal so that the orientation of the terminal is the same as that of the icon. In the present embodiment, the icon includes, but is not limited to, an icon of an arrow or a house, the direction of the icon is the direction of Muslim pilgrimage (north), and the direction of the upper end of the terminal is defined as the direction of the terminal. Thus when the orientation of the terminal is identical to the indicating direction of the icon, the icon would be located above the screen of the terminal, and when the orientation of the terminal is different from the indicating direction of the icon, the icon is located at other positions of the terminal screen. The terminal user can turn the terminal according to the relative orientation between the terminal direction and the indicating direction of the icon, so that the orientation of the terminal is to be the same as the indicating direction of the icon, and further enabling the terminal user to identify the direction of the pilgrimage correctly. The present disclosure also provides a terminal, which includes a processor and a memory, in which the memory is used for storing programs executable by the processor, and the processor is configured to execute the operations of the method as described above.

The above description is only the preferred embodiment of the present disclosure, and it should be noted that for those skilled in the art, several improvements and modifications can be made without departing from the principles of the present disclosure, should also be regarded within the scope of the present disclosure.

What is claimed is:

1. A method for implementing a theme for a terminal, comprising:
    setting a first theme and a second theme representing different usage scenarios for the terminal, the first theme being associated with a first application and the second theme being associated with a second application which is different from the first application,
    presetting, by the terminal, a first switching condition corresponding to the first theme and a second switching condition corresponding to the second theme, each of the first switching condition and the second switching condition being a date condition or a time condition;
    displaying an icon of the first application on the terminal while hiding an icon of the second application and displaying a first content related to the first theme in response to the first switching condition being met; and
    displaying the icon of the second application on the terminal while hiding the icon of the first application and displaying a second content related to the second theme in response to the second switching condition being met,
    wherein each of the first content and the second content is one or more of news, video and audio.

2. The method according to claim 1, wherein
    the first theme or the second theme is provided by the terminal or obtained from a server or a third-party application.

3. The method according to claim 1, wherein
    the first application or the second application is a standby background and/or a lock screen background.

4. The method according to claim 3, wherein the method further comprises:
    displaying, by the terminal, first information related to the first theme on the standby background or the lock screen background in the first theme, and displaying, by the terminal, second information related to the second theme on the standby background or the lock screen background in the second theme.

5. The method according to claim 1, wherein
    the first switching condition comprises that a system time of the terminal is within a first time period.

6. The method according to claim 1, wherein
    the second switching condition comprises that a system time of the terminal is within a second time period.

7. The method according to claim 1, wherein the method further comprises:
    judging, by a server, specific information of the terminal and pushing the first theme and/or the second theme to the terminal according to the specific information.

8. The method according to claim 7, wherein
    the specific information comprises religious belief of a user using the terminal.

* * * * *